US008839360B1

(12) United States Patent
Orr et al.

(10) Patent No.: US 8,839,360 B1
(45) Date of Patent: Sep. 16, 2014

(54) SCOPE-LIMITED ACTION-SPECIFIC AUTHORIZATION TOKEN

(71) Applicant: Marvell International Ltd., Hamilton (BM)

(72) Inventors: Michael Orr, Sunnyvale, CA (US); Naftali Tannin, Petach Tikva (IL); Zion Shohet, Hod Hasharon (IL)

(73) Assignee: Marvell International Ltd., Hamilton (BM)

( * ) Notice: Subject to any disclaimer, the term of this patent is extended or adjusted under 35 U.S.C. 154(b) by 70 days.

(21) Appl. No.: 13/627,321

(22) Filed: Sep. 26, 2012

Related U.S. Application Data

(60) Provisional application No. 61/543,224, filed on Oct. 4, 2011.

(51) Int. Cl.
*H04L 9/32* (2006.01)

(52) U.S. Cl.
USPC ........................................ 726/2; 726/3; 726/4

(58) Field of Classification Search
USPC ........ 726/2–7, 9–10; 713/150, 159, 168–172, 713/185
See application file for complete search history.

(56) References Cited

U.S. PATENT DOCUMENTS

| 6,332,193 | B1 * | 12/2001 | Glass et al. | 713/170 |
|---|---|---|---|---|
| 6,647,494 | B1 * | 11/2003 | Drews | 713/170 |
| 7,769,998 | B2 * | 8/2010 | Lynch et al. | 713/155 |
| 2006/0274695 | A1 * | 12/2006 | Krishnamurthi et al. | 370/331 |

* cited by examiner

*Primary Examiner* — Hosuk Song

(57) ABSTRACT

Methods having corresponding computer-readable media comprise: generating a authorization token, wherein the authorization token represents i) one or more actions for a target computer, wherein the one or more actions require an authorization, ii) one or more preconditions, wherein the preconditions must be true for the target computer to execute the one or more actions, and iii) the authorization; and providing the authorization token to a person, wherein the person does not have the authorization, and wherein the person provides the authorization token to the target computer.

20 Claims, 6 Drawing Sheets

SCOPE-LIMITED ACTION-SPECIFIC AUTHORIZATION TOKEN

CROSS-REFERENCE TO RELATED APPLICATION

This disclosure claims the benefit of U.S. Provisional Patent Application Ser. No. 61/543,224, filed on Oct. 4, 2011, entitled "Scope-Limited Task-Specific Access-Rights," the disclosure thereof incorporated by reference herein in its entirety.

FIELD

The present disclosure relates generally to the field of computer security. More particularly, the present disclosure relates to computer access authorization.

BACKGROUND

It is common practice to partition access to system functionality into different access classes, such that members of different classes have different levels of authorization and allowed actions. For example, employees and guests are usually allocated different levels of authorization for an organization's facility and resources.

A problem can arise, especially with remote systems, where some desired action or system access requires a level of authorization not held by anyone present at the system. One possible solution is to wait until a person with the necessary authorization is available, or can be dispatched to the relevant location. Another possible solution is to elevate one of the available personnel to the required access class. Neither of these two solutions may be acceptable or efficient. Sending a person having the necessary authorization to the site takes time, and may be costly. Elevating a locally-available person may be unacceptable because the person to be elevated may be unqualified in terms of knowledge. As another consideration, elevating an on-site person to a higher access class is usually an all-or-nothing action. Even if all that is needed is the ability to carry out one action of the elevated class, the elevated person obtains the authorization to carry out all actions of the elevated class.

SUMMARY

In general, in one aspect, an embodiment features a method comprising: generating a authorization token, wherein the authorization token represents i) one or more actions for a target computer, wherein the one or more actions require an authorization, ii) one or more preconditions, wherein the preconditions must be true for the target computer to execute the one or more actions, and iii) the authorization; and providing the authorization token to a person, wherein the person does not have the authorization, and wherein the person provides the authorization token to the target computer.

Embodiments of the method can include one or more of the following features. In some embodiments, the target computer, responsive to the person providing the authorization token to the target computer, executes the one or more actions responsive to the preconditions being true. Some embodiments comprise rendering the authorization token opaque to people. In some embodiments, the one or more actions include at least one of: executing a command; executing a computer program; providing data; and altering a state of the target computer. In some embodiments, the authorization token includes one or more attribute-value pairs, wherein each attribute-value pair represents a respective one of the preconditions, and wherein each attribute-value pair includes a respective attribute and a respective value for the respective attribute. In some embodiments, the attributes comprise at least one of: a password; a current state of the target computer; a temporal limitation; a geographic limitation; a presence or absence of a predetermined further authorization token; an identity of a person providing the authorization token to the target computer; an authorization of the person providing the authorization token to the target computer; an identity of a further computer, wherein the further computer generated the authorization token; an identity of a person that caused the further computer to generate the authorization token; and an authorization of the person that caused the further computer to generate the authorization token. In some embodiments, the target computer determines whether each precondition is true based on a comparison of the value for the respective attribute and a current value for the respective attribute.

In general, in one aspect, an embodiment features computer-readable media embodying instructions executable by a first computer to perform functions comprising: determining one or more actions a second computer must execute responsive to receiving a authorization token; determining one or more preconditions, wherein the preconditions must be true for the second computer to execute the one or more actions; and generating the authorization token, wherein the authorization token represents the one or more actions and the one or more preconditions.

Embodiments of the computer-readable media can include one or more of the following features. In some embodiments, the one or more actions include at least one of: executing a command; executing a computer program; providing data; and altering a state of the second computer. In some embodiments, the authorization token includes one or more attribute-value pairs, wherein each attribute-value pair represents a respective one of the preconditions, and wherein each attribute-value pair includes a respective attribute and a respective value for the respective attribute. In some embodiments, the attributes comprise at least one of: a password; a current state of the second computer; a temporal limitation; a geographic limitation; a presence or absence of a predetermined further authorization token; an identity of a person providing the authorization token to the second computer; an authorization of the person providing the authorization token to the second computer; an identity of a further computer, wherein the further computer generated the authorization token; an identity of a person that caused the further computer to generate the authorization token; and an authorization of the person that caused the further computer to generate the authorization token. In some embodiments, the functions further comprise at least one of: encoding the authorization token; and encrypting the authorization token.

In general, in one aspect, an embodiment features computer-readable media embodying instructions executable by a computer to perform functions comprising: receiving a authorization token; determining one or more actions based on the authorization token; determining one or more preconditions based on the authorization token; determining whether each of the preconditions is true; and executing the one or more actions responsive to the preconditions being true.

Embodiments of the computer-readable media can include one or more of the following features. In some embodiments, the one or more actions include at least one of: executing a command; executing a computer program; providing data; and altering a state of the computer. In some embodiments, the authorization token includes one or more attribute-value pairs, wherein each attribute-value pair represents a respective one of the preconditions, and wherein each attribute-value pair includes a respective attribute and a respective value for the respective attribute. In some embodiments, determining whether one of the preconditions is true comprises: comparing the value for the respective attribute to a current value for the respective attribute. In some embodiments, the attributes comprise at least one of a password; a current state of the computer; a temporal limitation; a geographic limitation; a presence or absence of a predetermined further authorization token; an identity of a person providing the authorization token to the computer; an authorization of the person providing the authorization token to the computer; an identity of a further computer, wherein the further computer generated the authorization token; an identity of a person that caused the further computer to generate the authorization token; and an authorization of the person that caused the further computer to generate the authorization token. In some embodiments, the functions further comprise: receiving the authorization token from a local user interface of the computer. In some embodiments, the functions further comprise at least one of: decoding the authorization token; and decrypting the authorization token. In some embodiments, the functions further comprise at least one of: determining an authorization based on the authorization token; and executing the one or more actions responsive to the authorization.

The details of one or more implementations are set forth in the accompanying drawings and the description below. Other features will be apparent from the description and drawings, and from the claims.

Figure 1:
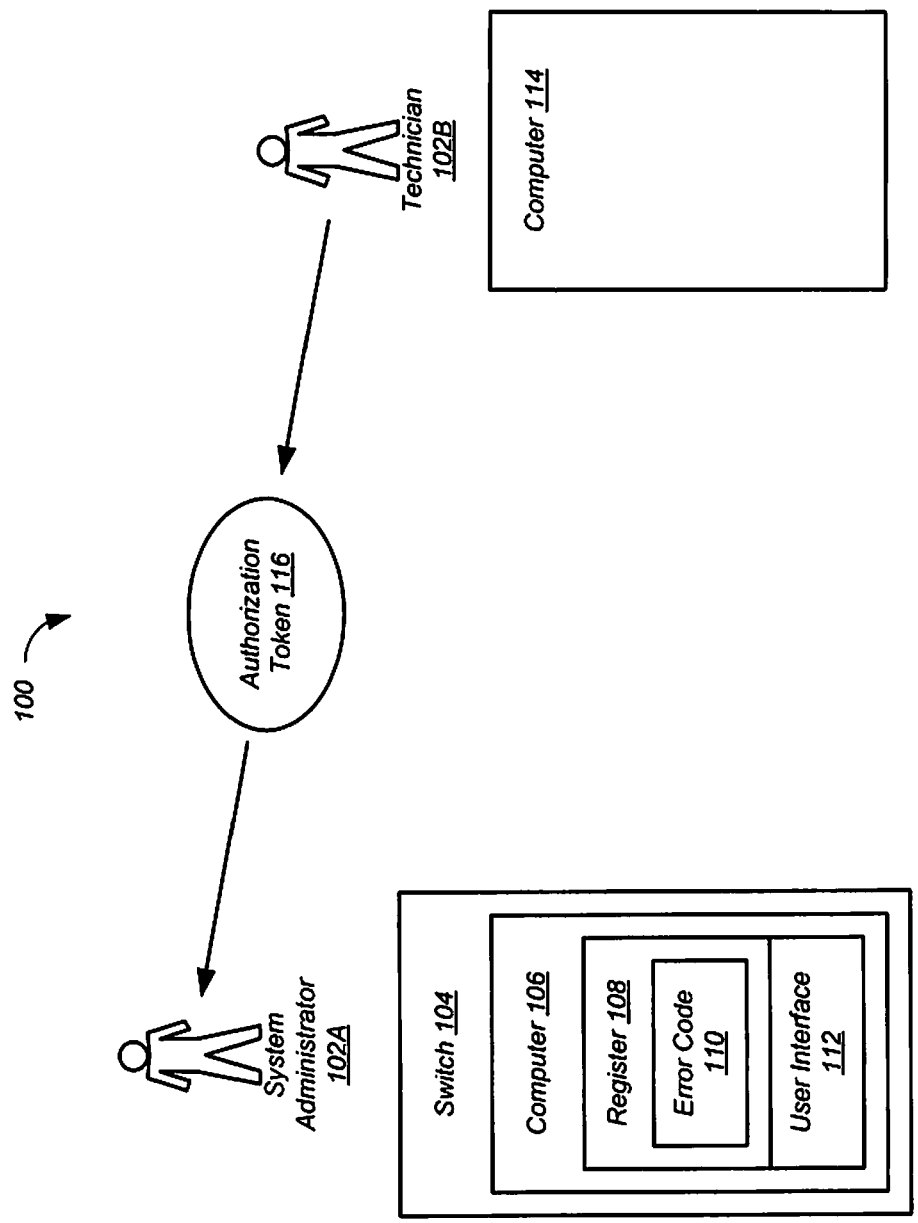
FIG. 1 shows elements of a scope-limited action-specific authorization token system according to one embodiment.

The leading digit(s) of each reference numeral used in this specification indicates the number of the drawing in which the reference numeral first appears.

DETAILED DESCRIPTION

Embodiments of the present disclosure provide scope-limited action-specific authorization tokens. The described authorization token allows a user to initiate system actions that are normally not available to the user due to the user having insufficient authorization. The system actions the user can initiate are limited. For example, the allowed actions may include only one or more predetermined commands. As another example, certain actions may be explicitly prohibited. The scope for initiating the actions is also limited. For example, the scope of the actions may be limited to a particular computer, a particular date, and the like. The token may be encoded or encrypted so as to be unintelligible to a user.

FIG. 1 shows elements of a scope-limited action-specific authorization token system 100 according to one embodiment. Although in the described embodiments the elements of system 100 are presented in one arrangement, other embodiments may feature other arrangements. For example, elements of system 100 can be implemented in hardware, software, or combinations thereof.

FIG. 1 depicts two users who are remote from each other. For example, the users can be located on different continents. One user is a system administrator 102A for a switch 104 that includes a computer 106 (also referred to herein as the "target computer" 106) for controlling the switch 104, configuring the switch 104, and the like. In this example, the switch 104 has malfunctioned, and has stored a confidential error code 110 in a register 108 of the computer 106. In order to diagnose the malfunction, it is necessary to view the confidential error code 110. However, the local system administrator 102A does not have the authorization necessary to view the confidential error code 110.

The other user is a technician 102B. The technician 102B has the proper authorization to view the confidential error code 110, and could do so by entering his technician password on a local user interface 112 of the computer 106, but is geographically remote from the switch 104. Furthermore, the switch 104 does not allow remote access.

One possible solution is for the technician 102B to travel to the switch 104 to enter his technician password on a local user interface 112 of the computer 106, and so view the confidential error code 110. However, this solution is not only costly, but also time-consuming. The switch 104 must remain idle until the technician 102B arrives. Another possible solution is to provide the technician password to the local system administrator 102A. However, this approach poses significant security risks. The technician password will allow the local system administrator 102A to access not only the register 108 storing the confidential error code 110, but also to access the entire switch. Furthermore, the local system administrator 102A may provide the password to other system administrators of similar switches 104, to competitors of the manufacturer of the switch 104, and the like.

Figure 2:
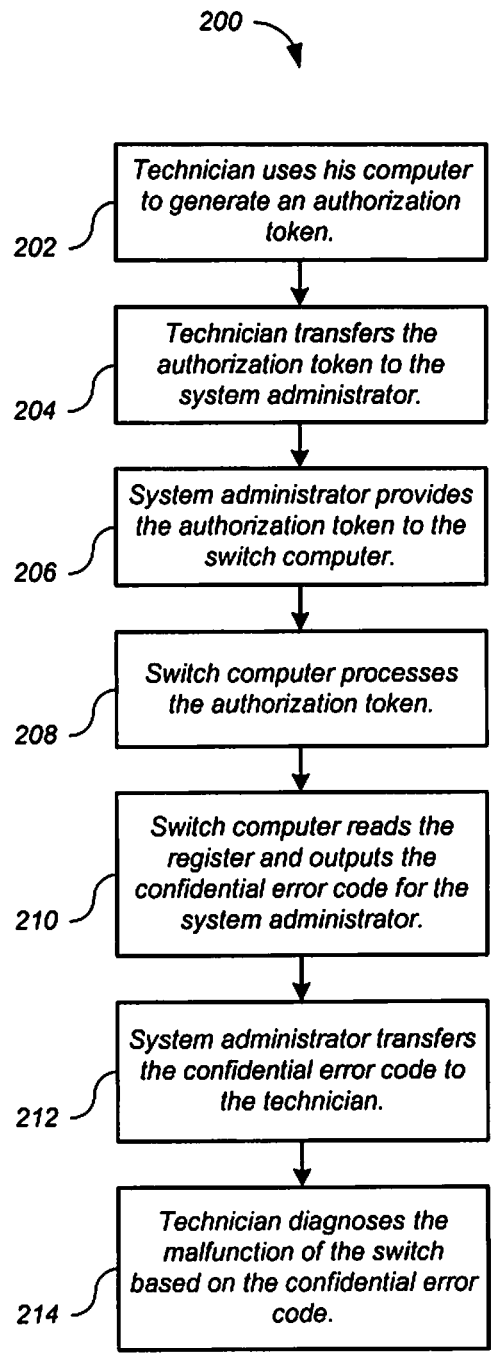
FIG. 2 shows a process for the system of FIG. 1 according to one embodiment.

FIG. 2 shows a process 200 for the system 100 of FIG. 1 according to one embodiment. Although in the described embodiments the elements of process 200 are presented in one arrangement, other embodiments may feature other arrangements. For example, in various embodiments, some or all of the elements of process 200 can be executed in a different order, concurrently, and the like. Also some elements of process 200 may not be performed, and may not be executed immediately after each other. In addition, some or all of the elements of process 200 can be performed automatically, that is, without human intervention.

Figure 3:
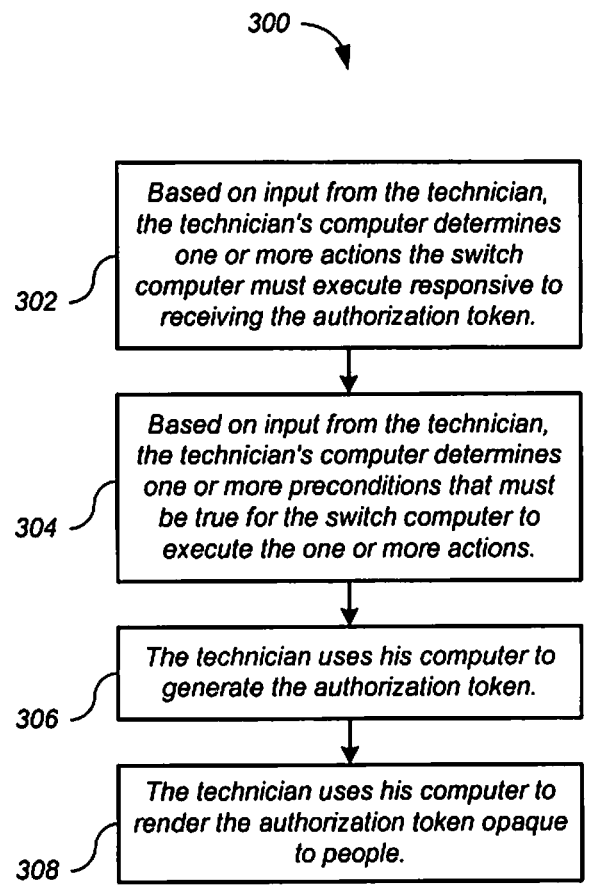
FIG. 3 shows a process for generating the authorization token of FIG. 1 according to one embodiment.

Referring to FIG. 2, at 202, the technician 102B uses his computer 114 to generate a authorization token 116. FIG. 3 shows a process 300 for generating the authorization token 116 of FIG. 1 according to one embodiment. Although in the described embodiments the elements of process 300 are presented in one arrangement, other embodiments may feature other arrangements. For example, in various embodiments, some or all of the elements of process 300 can be executed in a different order, concurrently, and the like. Also some elements of process 300 may not be performed, and may not be executed immediately after each other. In addition, some or all of the elements of process 300 can be performed automatically, that is, without human intervention.

Referring to FIG. 3, at 302, based on input from the technician 102B, the technician's computer 114 determines the one or more actions the switch computer 106 must execute responsive to receiving the authorization token 116. In the example of FIG. 1, the action is reading the register 108 to output the confidential error code 110. At 304, based on input from the technician 102B, the technician's computer 114 determines one or more preconditions that must be true for the switch computer 106 to execute the one or more actions. In the example of FIG. 1, the preconditions can specify the name of the switch computer 106, the date on which the authorization token 116 must be used, the number of times the authorization token 116 can be used, and the like. At 306, the technician 102B uses his computer 114 to generate the authorization token 116.

In some embodiments, at 308, the technician 102B uses his computer 114 to render the authorization token 116 opaque to people. For example, the technician 102B uses his computer 114 to encode and/or encrypt the authorization token 116. The authorization token 116 may be strongly or weakly encoded/encrypted, depending on the desired level of secrecy. Simple encoding or hashing (for example using the MD5 Message-Digest Algorithm or the like) may be used to prevent reading of the contents of the authorization token 116 by a casual reader. Strong encryption based on public/private keys, shared-secret keys, or the like may be used to guarantee that only the target computer 106 can decode the authorization token 116. In some embodiments, the technician 102B may be required to supply a first authorization token 116 in order to generate or modify a second authorization token 116.

Figure 4:
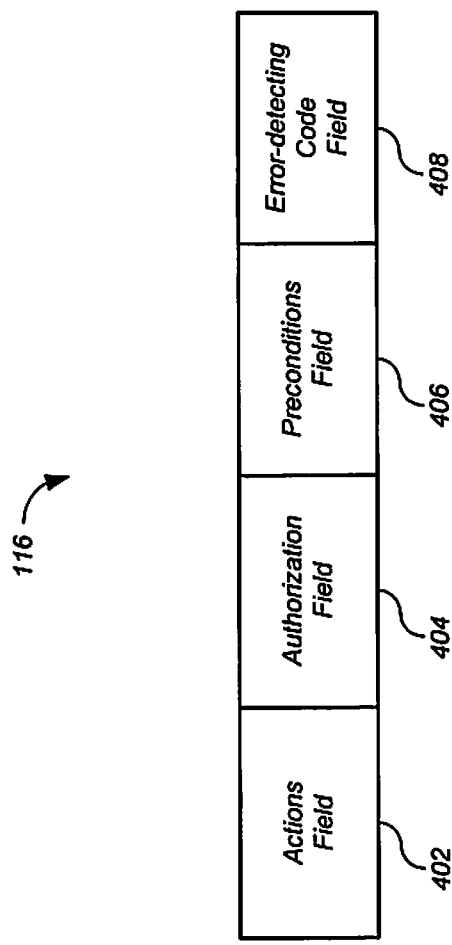
FIG. 4 shows an example authorization token for the example of FIGS. 1 and 3.

FIG. 4 shows an example authorization token 116 for the example of FIGS. 1 and 3. Referring to FIG. 4, the authorization token 116 includes an actions field 402, an authorization field 404, a preconditions field 406, and an error-detecting code field 408. The actions field 402 lists one or more actions that computer 106 must execute responsive to receiving the authorization token 116. The authorization field 404 provides the authorization required by the computer 106 to execute the one or more actions in the actions field 402. In the example of FIG. 1, the authorization is the technician password belonging to the technician 102B. The preconditions field 406 lists one or more preconditions that must be true for the computer 106 to execute the one or more actions listed in the actions field 402. In the example of FIG. 1, the preconditions can specify the name of the switch computer 106, the date on which the authorization token 116 must be used, the number of times the authorization token 116 can be used, and the like. The error-detecting code field 408 can include an error-detecting code for the authorization token such as a cyclic redundancy check (CRC) code or the like.

Referring again to FIG. 2, at 204, the technician 102B transfers the authorization token 116 to the system administrator 102A. The authorization token 116 can be transferred by any means. For example, the authorization token 116 can be sent over a network as a digital message, emailed as a string, read aloud over a telephone connection as a string, and the like.

At 206, the system administrator 102A provides the authorization token 116 to the switch computer 106. For example, the system administrator 102A can enter the authorization token 116 as a string using the local user interface 112 of the computer 106, provide the authorization token on a memory device such as a universal serial bus (USB) memory stick, and the like. At 208, the switch computer 106 processes the authorization token 116.

Figure 5:
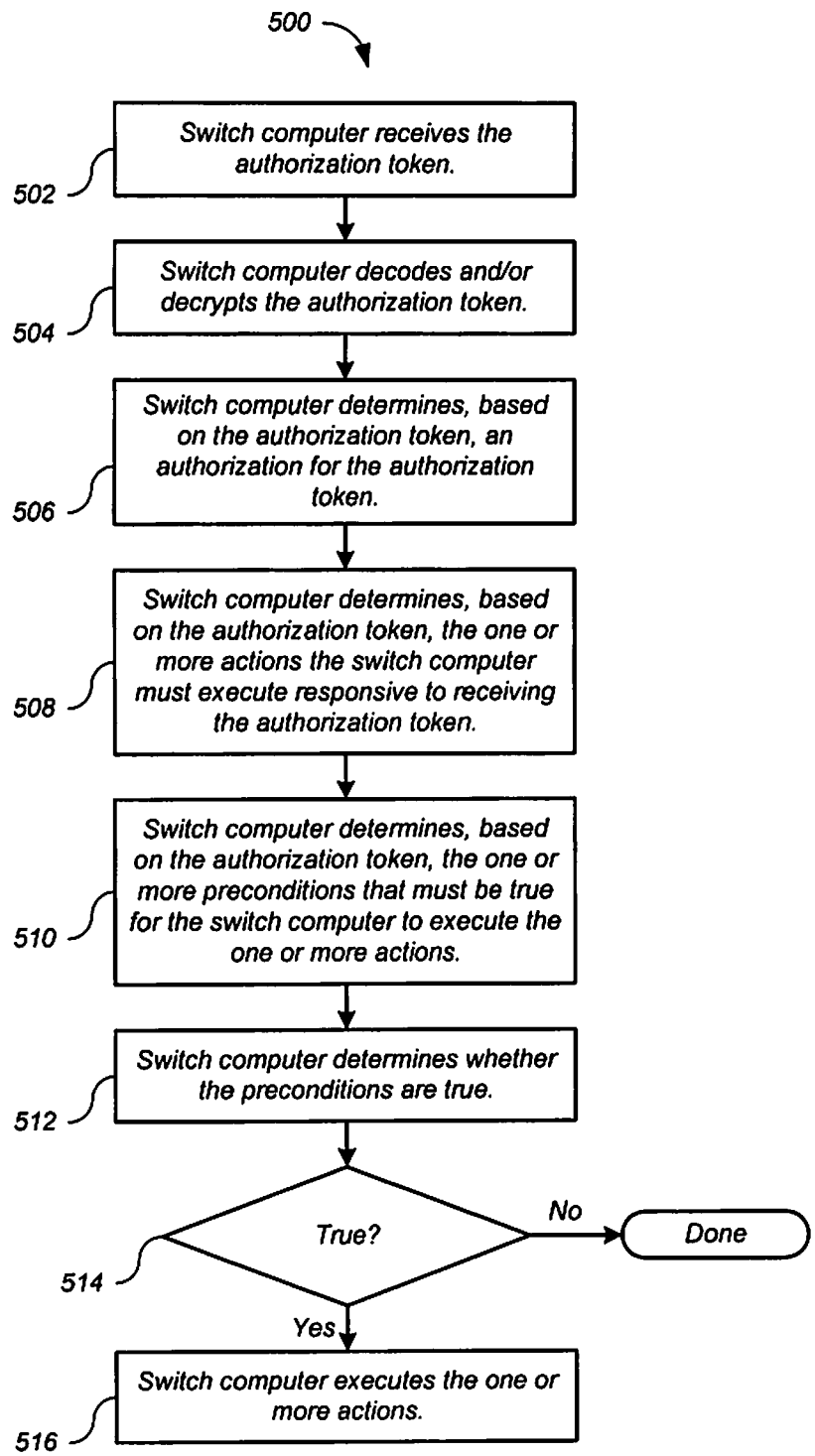
FIG. 5 shows a process for the switch computer of FIG. 1 to process the authorization token of FIGS. 1 and 4 according to one embodiment.

FIG. 5 shows a process 500 for the switch computer 106 of FIG. 1 to process the authorization token 116 of FIGS. 1 and 4 according to one embodiment. Although in the described embodiments the elements of process 500 are presented in one arrangement, other embodiments may feature other arrangements. For example, in various embodiments, some or all of the elements of process 500 can be executed in a different order, concurrently, and the like. Also some elements of process 500 may not be performed, and may not be executed immediately after each other. In addition, some or all of the elements of process 500 can be performed automatically, that is, without human intervention.

Referring to FIG. 5, at 502, the switch computer 106 receives the authorization token 116. At 504, in some embodiments, the switch computer 106 decodes and/or decrypts the authorization token 116. At 506, the switch computer 106 determines, based on the authorization token 116, an authorization for the authorization token. In the example of FIG. 4, the authorization can be determined based on the authorization field 404 of the authorization token 116. At 508, the switch computer 106 determines, based on the authorization token 116, the one or more actions the switch computer 106 must execute responsive to receiving the authorization token 116. In the example of FIG. 4, the actions can be determined based on the actions field 402 of the authorization token 116. At 510, the switch computer 106 determines, based on the authorization token 116, the one or more preconditions that must be true for the switch computer 106 to execute the one or more actions. In the example of FIG. 4, the preconditions can be determined based on the preconditions field 406 of the authorization token 116. At 512, the switch computer 106 determines whether the preconditions are true. At 514, if the preconditions are true, then at 516, the switch computer 106 executes the one or more actions.

Returning to FIG. 2, at 210, the computer 106 reads the register 108 and outputs the confidential error code 110 for the system administrator 102B. At 212, the system administrator 102A transfers the confidential error code 110 to the technician 102B. This transfer can be accomplished by any means. At 214, the technician 102B diagnoses the malfunction of the switch 104 based on the confidential error code 110.

The actions represented by the authorization token 116 are not limited by the examples given above or elsewhere herein. Example actions include executing a command, executing a computer program, providing data, altering a state of the computer, for example by rebooting the computer, and the like.

Figure 6:
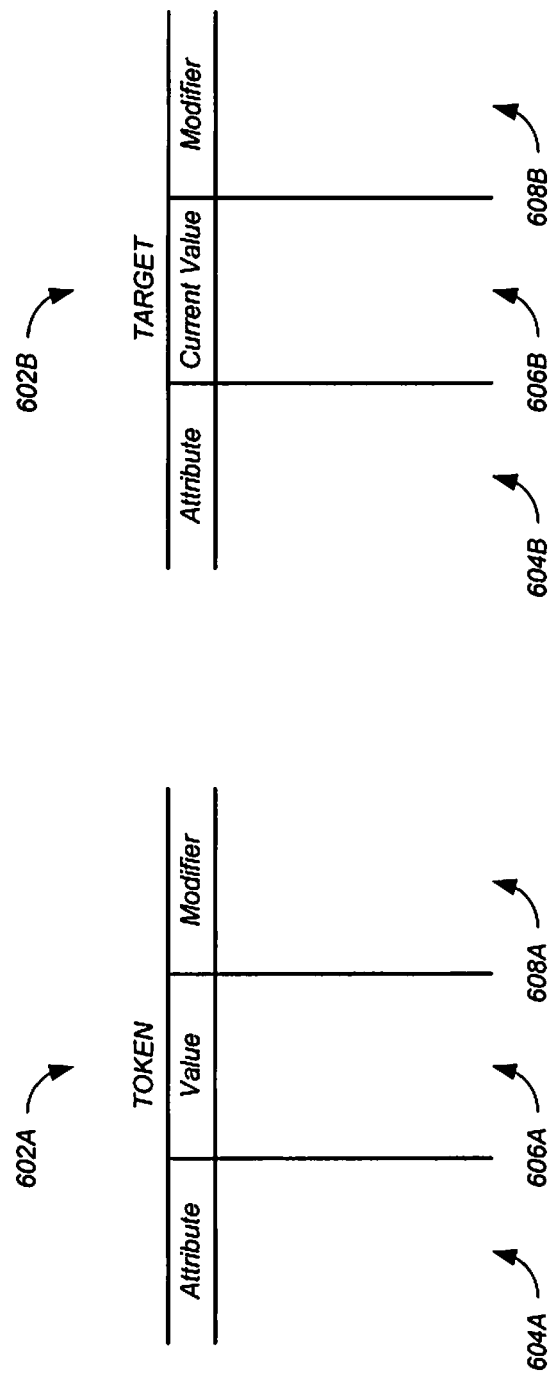
FIG. 6 depicts an attribute-value table for the authorization token of FIG. 1 and an attribute-current-value table for the target computer of FIG. 1 according to one embodiment.

In some embodiments, each of the preconditions is implemented as an attribute-value pair. FIG. 6 depicts an attribute-value table 602A (labeled "Token") for the authorization token 116 of FIG. 1 and an attribute-current-value table 602B (labeled "Target") for the target computer 106 of FIG. 1 according to one embodiment. Token table 602A has one or more rows, each corresponding to one of the preconditions of the authorization token 116. Token table 602A includes a column 604A for the attributes and a column 606A for the values. In some embodiments, token table 602 also includes a column 608A for modifiers such as wildcards and the like. Target table 602B has one or more rows, each corresponding to a possible precondition of the authorization token 116. Target table 602B includes a column 604B for the attributes and a column 606B for the current values. In some embodiments, target table 602B also includes a column 608B for modifiers such as wildcards and the like. In order to determine whether a precondition is true, the target computer 106 compares the value (at 606A) of the respective attribute (at 604A) in the authorization token 116 to the current value (at 606B) kept by the target computer 106 for that attribute (at 604B), subject to any wildcards (at 608A,B) in the tables 602A,B.

The attributes represented by the authorization token 116 are not limited by the examples given above or elsewhere herein. Example attributes include passwords, the name of the target computer 106, the type of the target computer 106, the MAC address of the target computer 106, the current state of the target computer 106, and the like. Other example attributes include temporal and geographic limitations. For example, use of the authorization token 116 can be limited to a specified date range, to business hours, to a particular city or building, and the like. The limitations can be conditional. For example, the authorization token 116 can only be used after the target computer has been down for two days. Other example attributes include the identity of the person providing the authorization token 116 to the target computer 106, the authorization level of the person providing the authorization token 116 to the target computer 106; the identity of the computer 114 that generated the authorization token 116; the identity of the person that caused the computer 114 to generate the authorization token 116; the authorization level of the person that caused the computer 114 to generate the authorization token 116, and the like. In some embodiments, two or more authorization tokens 116 are required. In such embodiments, the attributes include the presence or absence of the other required authorization tokens 116.

While in the disclosed embodiments the target computer 106 is described as a switch computer 106 for a switch 104, other embodiments can apply to any sort of target computer 106. For example, the target computer 106 can be the computer 106 in a vehicle. One example application would be to use a authorization token 116 as a car key that would allow the user to drive the car only during daylight hours, only within a certain neighborhood, only in an emergency, and the like.

In the embodiments described above, the authorization token 116 includes prescribed actions, that is, actions that the target computer 106 must take responsive to receiving the authorization token 116. In other embodiments, the authorization token 116 includes proscribed actions, that is, actions that the target computer 106 must not take responsive to receiving the authorization token 116. The scope for the proscribed actions may also be limited. For example, the scope of the proscribed actions may be limited to a particular computer, a particular date, and the like, for example as described above for prescribed actions.

Various embodiments provide one or more of the advantages listed below. In embodiments where the token is encoded and/or encrypted, the token is unintelligible to a user. Therefore a user with low-level authorization for a system can act as a courier to deliver the disclosed authorization tokens to the system, thereby initiating actions requiring high-level authorization. The scope limits for the authorization tokens protect the target computer against man-in-the-middle attacks, replay-attacks, and token-replication, and the like.

While various embodiments are described in the context of access to computer systems, other embodiments have broader applicability. For example, other embodiments apply to access rights to a physical location, to granting temporary rights to a remote individual to approve or order an action at a remote location, and the like. For example, a suitable coupon can authorize the bearer to get a special discount price from a check-out person who is not authorized to give the special discount price. As another example, a CFO could allow someone to sign off on expenses on a scale that usually requires the signature of the CFO, without also letting that person have other access only the CFO should have. Other examples are listed below.

A token could allow a remote person to disburse money that he can't usually disburse—but only for specific reasons, or types of payments, or time-limited, or to a specific recipient only, or that relate to a specific project only. A token could allow a remote person to operate some machine in a limited fashion. As an example, a token could allow a pilot to taxi (or even fly, once) an airplane that is blocking some runway even though that pilot is not yet fully licensed on that aircraft type. In a military context, a token could allow an NCO to handle tasks that usually require an officer's authority. A token could allow someone remote access to a secure, locked area he would normally be kept out of. A token could allow someone to temporarily be exempt from some rules/laws regulations. A token could allow appointment of a deputy sheriff for the duration of a posse, and only to chase bank robbers. A token could allow a person to see classified material about only one project even though his clearance level would normally not be enough, without elevating his clearance level in general. For example, in a public corporation, a token could allow a non-insider product manager to see sales projections, cost breakdowns, and other financially material information—but only for one specific product or project, only for a pre-defined period of time, and only for information relating to one specific geographical area. A token could be a parking card that would allow parking only for a certain duration, only park in a specific location, or a specific car, in a normally-closed area, and the like. Various embodiments of the present disclosure can be implemented in digital electronic circuitry, or in computer hardware, firmware, software, or in combinations thereof. Embodiments of the present disclosure can be implemented in a computer program product tangibly embodied in a computer-readable storage device for execution by a programmable processor. The described processes can be performed by a programmable processor executing a program of instructions to perform functions by operating on input data and generating output. Embodiments of the present disclosure can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, processors receive instructions and data from a read-only memory and/or a random access memory. Generally, a computer includes one or more mass storage devices for storing data files. Such devices include magnetic disks, such as internal hard disks and removable disks, magneto-optical disks; optical disks, and solid-state disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations have been described. Nevertheless, various modifications may be made without departing from the scope of the disclosure. Accordingly, other implementations are within the scope of the following claims.

What is claimed is:
1. A method comprising:
generating an authorization token, wherein the authorization token represents
i) one or more actions for a target computer, wherein the one or more actions require an authorization, and wherein the one or more actions include at least one of

(a) executing a command, (b) executing a computer program, and (c) altering a state of the target computer;

ii) one or more preconditions, wherein the preconditions must be true for the target computer to execute the one or more actions; and iii) the authorization; and providing the authorization token to the target computer.

2. The method of claim 1, wherein:
the target computer executes the one or more actions responsive to
i) receiving the authorization token; and
ii) the preconditions being true.

3. The method of claim 1, further comprising:
rendering the authorization token opaque to people.

4. The method of claim 1, wherein the one or more actions include providing data.

5. The method of claim 1, wherein:
the authorization token includes one or more attribute-value pairs, wherein each attribute-value pair represents a respective one of the preconditions, and wherein each attribute-value pair includes a respective attribute and a respective value for the respective attribute.

6. The method of claim 5, wherein the attributes comprise at least one of:
a password;
a current state of the target computer;
a temporal limitation;
a geographic limitation;
a presence or absence of a predetermined further authorization token;
an identity of a person providing the authorization token to the target computer;
an authorization of the person providing the authorization token to the target computer;
an identity of a further computer, wherein the further computer generated the authorization token;
an identity of a person that caused the further computer to generate the authorization token; and
an authorization of the person that caused the further computer to generate the authorization token.

7. The method of claim 5, wherein:
the target computer determines whether each precondition is true based on a comparison of the value for the respective attribute and a current value for the respective attribute.

8. Non-transitory computer-readable media embodying instructions executable by a first computer to perform functions comprising:
determining one or more actions a second computer must execute responsive to receiving an authorization token, wherein the one or more actions include at least one of (i) executing a command, (ii) executing a computer program, and (iii) altering a state of the second computer;
determining one or more preconditions, wherein the preconditions must be true for the second computer to execute the one or more actions; and
generating the authorization token, wherein the authorization token represents the one or more actions and the one or more preconditions.

9. The non-transitory computer-readable media of claim 8, wherein the one or more actions include providing data.

10. The non-transitory computer-readable media of claim 8, wherein:
the authorization token includes one or more attribute-value pairs, wherein each attribute-value pair represents a respective one of the preconditions, and wherein each attribute-value pair includes a respective attribute and a respective value for the respective attribute.

11. The non-transitory computer-readable media of claim 10, wherein the attributes comprise at least one of:
a password;
a current state of the second computer;
a temporal limitation;
a geographic limitation;
a presence or absence of a predetermined further authorization token;
an identity of a person providing the authorization token to the second computer;
an authorization of the person providing the authorization token to the second computer;
an identity of a further computer, wherein the further computer generated the authorization token;
an identity of a person that caused the further computer to generate the authorization token; and
an authorization of the person that caused the further computer to generate the authorization token.

12. The non-transitory computer-readable media of claim 10, wherein the functions further comprise at least one of:
encoding the authorization token; and
encrypting the authorization token.

13. Non-transitory computer-readable media embodying instructions executable by a computer to perform functions comprising:
receiving an authorization token;
determining one or more actions based on the authorization token, wherein the one or more actions include at least one of (i) executing a command, (ii) executing a computer program, and (iii) altering a state of the computer;
determining one or more preconditions based on the authorization token;
determining whether each of the preconditions is true; and
executing the one or more actions responsive to the preconditions being true.

14. The non-transitory computer-readable media of claim 13, wherein the one or more actions include providing data.

15. The non-transitory computer-readable media of claim 13, wherein:
the authorization token includes one or more attribute-value pairs, wherein each attribute-value pair represents a respective one of the preconditions, and wherein each attribute-value pair includes a respective attribute and a respective value for the respective attribute.

16. The non-transitory computer-readable media of claim 15, wherein determining whether one of the preconditions is true comprises:
comparing the value for the respective attribute to a current value for the respective attribute.

17. The non-transitory computer-readable media of claim 15, wherein the attributes comprise at least one of:
a password;
a current state of the computer;
a temporal limitation;
a geographic limitation;
a presence or absence of a predetermined further authorization token;
an identity of a person providing the authorization token to the computer;
an authorization of the person providing the authorization token to the computer;
an identity of a further computer, wherein the further computer generated the authorization token;
an identity of a person that caused the further computer to generate the authorization token; and an authorization of the person that caused the further computer to generate the authorization token.

18. The non-transitory computer-readable media of claim 13, wherein the functions further comprise:
receiving the authorization token from a local user interface of the computer.

19. The non-transitory computer-readable media of claim 13, wherein the functions further comprise at least one of:
decoding the authorization token; and
decrypting the authorization token.

20. The non-transitory computer-readable media of claim 13, wherein the functions further comprise at least one of:
determining an authorization based on the authorization token; and
executing the one or more actions responsive to the authorization.

* * * * *